June 2, 1964  A. GROSJEAN  3,135,185
DEVICE FOR ADJUSTING THE DIAPHRAGM OF AN OBJECTIVE
Filed March 21, 1961
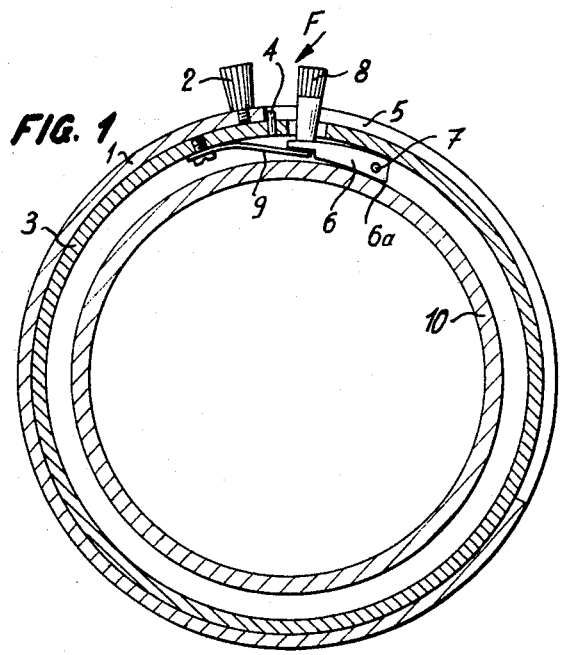
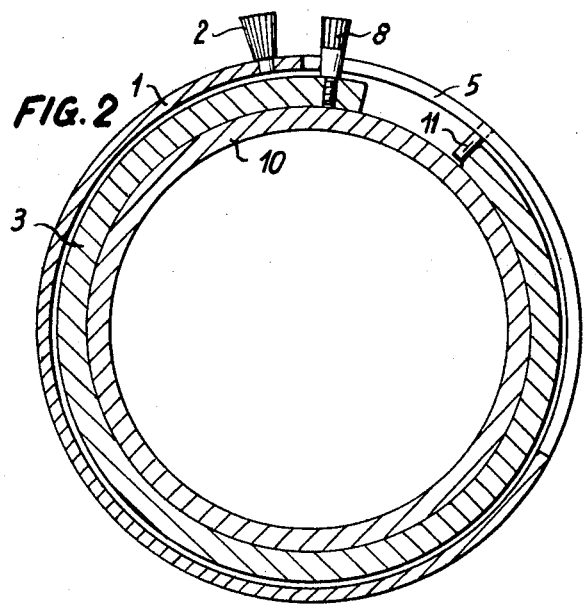
INVENTOR
ARNOLD GROSJEAN United States Patent Office 3,135,185
Patented June 2, 1964

3,135,185
DEVICE FOR ADJUSTING THE DIAPHRAGM
OF AN OBJECTIVE
Arnold Grosjean, Yverdon, Vaud, Switzerland, assignor to Paillard S.A., Sainte-Croix, Vaud, Switzerland, a corporation of Switzerland
Filed Mar. 21, 1961, Ser. No. 97,301
Claims priority, application Switzerland Mar. 29, 1960
3 Claims. (Cl. 95—64)

Devices are already known for adjusting the diaphragm of an objective, particularly for a camera, including a control ring the position of which determines the degree of opening of the diaphragm. The control ring is capable of co-operating with an adjustable stop ring which permits limiting the possible movement of the control ring. A locking device is also included which enables fixing of the stop ring in position. The stop ring is provided with a control knob which is movable against an elastic action so as to release the locking device. These devices are also useful for filming a movie fade-in or fade-out, wherein a scene is begun or terminated, respectively, by a gradual opening of the diaphragm from a closed setting, or a gradual closing of the diaphragm from its correct setting.

When a camera is provided with a photo-electric cell located behind the objective and with a reflex viewing device, the known devices for adjusting the diaphragm are not very practical in certain conditions of use. In fact, assuming that the operator initially desires to effect a measurement of the luminosity and then effect solely the focussing through the reflex sight, he should first move the stop ring into the extreme closing position of the diaphragm so as to be capable of freely maneuvering the control ring of the diaphragm for the purpose of adjustment, taking into account the light of the scene to be photographed. The operator should then bring the stop ring to a value equal to that which he has found for the diaphragm. In order to carry out this operation, the operator must give his undivided attention to the position of the control ring of the diaphragm and he cannot then remain in a position enabling him to be ready to effectively operate the camera to take the desired photograph. Thereupon, he can move the control ring of the diaphragm to the maximum opening position of the latter and effect the adjustment of the focussing. At this moment, while retaining a position so as to be ready to take the photograph, he can move the control ring of the diaphragm to the desired position by moving it until the movement of said ring is limited by the stop ring.

The present invention has for its object to simplify these operations. It relates to a device for the adjustment of a diaphragm of the above-mentioned type of very simple construction, characterised in that the control ring also has a control knob fixed thereto in such a manner as to be in proximity of the control knob of the stop ring when these two rings occupy the position for which the angular displacement of the ring is limited by the stop ring. The control knob is movable against the aforesaid elastic action in a direction towards the control knob of the ring.

Two forms of construction of the device, according to the invention, are shown diagrammatically and by way of example in the accompanying drawings, wherein:

FIG. 1 is a section transversely to the axis of the objective of the first form of construction.

FIG. 2 is a similar section of the second form of construction.

The device illustrated comprises a ring 1 which constitues the control member of the diaphragm and which carries an operating member in the form of a milled knob 2.

A second ring 3, disposed concentrically in the ring 1, constitutes the stop member. This ring 3 carries a stud 4 engaged in a slot 5 of the ring 1 and providing a stop for said last mentioned ring.

The ring 3 also carries a locking device including an arm 6 pivotally mounted on a hinge point 7 secured to the ring 3 and carrying an operating member in the form of a milled knob 8. The arm 6 is subjected to the action of a spring 9 secured to the ring 3 which tends to cause said arm to pivot in a clockwise direction, in such a manner that the part 6a of the said arm, normally applies pressure on a stationary sleeve 10 of the objective, to thereby prevent any movement between the ring 3 and the sleeve 10 in a clockwise direction.

When it is desired to cause the ring 3 to turn relatively to the sleeve 10, it is necesary to eliminate the locking effect of the arm 6, which is accomplished by acting on the knob, so as to cause the arm 6 to pivot slightly against the action of the spring 9. During this pivoting of the arm 6 and by reason of the position of the hinge axis 7, it is to be observed that the extremity of the knob 8 effects a movement in the direction of the arrow F, this displacement presenting an axial component directed towards the axis of the objective and a tangential component directed towards the operating knob 2 of the control ring 1 of the diaphragm. By this operation, it will be seen that the release of the ring 3 may be controlled by the operator either by applying axial pressure on the end of the knob 8, or by pressing together the knobs 2 and 8, which are disposed in proximity to one another when the ring 1 is in the stop position against the stud 4 of the ring 3, as shown in the drawing.

When the operator desires to effect the desired measurement by means of a photo-electric cell disposed behind the objective, he presses the two knobs 2 and 8 against one another, which releases the ring 3 and enables him to turn this ring together with the ring 1 up to the necessary position which is generally obtained when the pointer of the photometer comes opposite a mark. At this moment, the operator releases the knob 8, which causes the locking of the stop ring 3 and, without leaving his viewing position, he can cause the ring 1 to pivot by acting on the operating knob 2 so as to open the diaphragm to its maximum value for the purpose of effecting the adjustment of the focus through the objective. This latter adjustment having been effected, he then causes the ring 1 to pivot by moving the knob 2 until the end of the slot 5 abuts against the stud 4. The apparatus is thus adjusted and the operator can effect the photographing of the desired view.

FIG. 2 shows a simpler form of construction, in which the stop ring 3 comprises a split ring clamped on the sleeve 10 due to its natural elasticity together with the inner diameter of the ring 3 in its at rest or relaxed position is slightly less than the outer diameter of the sleeve 10. The knob 8 is screwed directly onto the ring 3. The adjusting ring 1 is spaced from ring 3 and is provided with a stud 11 adapted to abut against a free end of the ring 3. It will be seen that when the knobs 2 and 8 are moved towards one another, there is caused a separation of the two free edges of the ring 3 since one of these edges carries the knob 8, while its other edge abuts against the stud 11. Thus, the ring 3 is released from engagement with the sleeve 10 and can turn without difficulty thereon. It is also possible to cause the ring 3 to turn without, at the same time, causing the ring 1 to turn. In this case the knob 8 should be pulled outwardly so as to cause the release of the split ring 3.

I claim:

1. A device for adjusting the diaphragm of an objective, particularly for a camera, comprising a control ring the position of which determines the degree of opening of said diaphragm, an adjustable stop ring cooperating with said control ring and permitting limitation of possible movement of said control ring, locking means normally securing said stop ring against angular displacement in one direction, a first control knob projecting outwardly from said stop ring and displaceable tangentially to the objective against an elastic action to release said locking means, a second control knob projecting outwardly from said control ring, said second control knob fixedly attached to the control ring and disposed so as to be in proximity to said first control knob of said stop ring when said two rings occupy a position for which the angular displacement of said control ring is limited by said stop ring, said control knob of said stop ring attached to said locking means, whereby tangential displacement of said control knob of said stop ring toward said control knob of said control ring releases said locking means to permit movement of said stop ring.

2. A device for adjusting the diaphragm of an objective, particularly for a camera, comprising a control ring the position of which determines the degree of opening of said diaphragm, an adjustable stop ring cooperating with said control ring and permitting limitation of possible movement of said control ring, a locking device comprising a pivoting member, and a spring acting on said pivoting member whereby pressure is exerted by said pivoting member on a stationary part of said objective for fixing said stop ring in position, a control knob on said stop ring and movable against an elastic action so as to release said locking device, a control knob for said control ring, said control knob fixed to the control ring in such a manner as to be in proximity to said control knob of said stop ring when said two rings occupy a position for which the angular displacement of said control ring is limited by said stop ring, said control knob of said stop ring being fastened to said pivoting member whereby movement of said control knob of said stop ring towards said control knob of said control ring releases the pressure of said pivoting member on said stationary part of said objective to permit movement of said stop ring.

3. A device according to claim 1 wherein said locking means comprises a cut-out portion in said stop ring forming a pair of spaced apart free ends on said stop ring, said control knob on said stop ring attached adjacent one of said free ends thereof, the other free end of said ring adapted to abut against a part of said control ring, said split ring elastically clamping the stationary part of said objective, whereby movement of the control ring knob and the locking ring knob towards each other expands said split ring and releases it from engagement with said stationary part of the objective to permit adjustment of the diaphragm of the objective.

References Cited in the file of this patent

UNITED STATES PATENTS

| | | |
|---|---|---|
| 2,222,298 | Nerwin | Nov. 19, 1940 |
| 2,612,093 | Schutz | Sept. 30, 1952 |
| 2,878,738 | Uhland | Mar. 24, 1959 |